Dec. 13, 1955  K. W. JERNSTRÖM  2,726,623
HATCH COVER
Filed Oct. 15, 1952  9 Sheets-Sheet 1
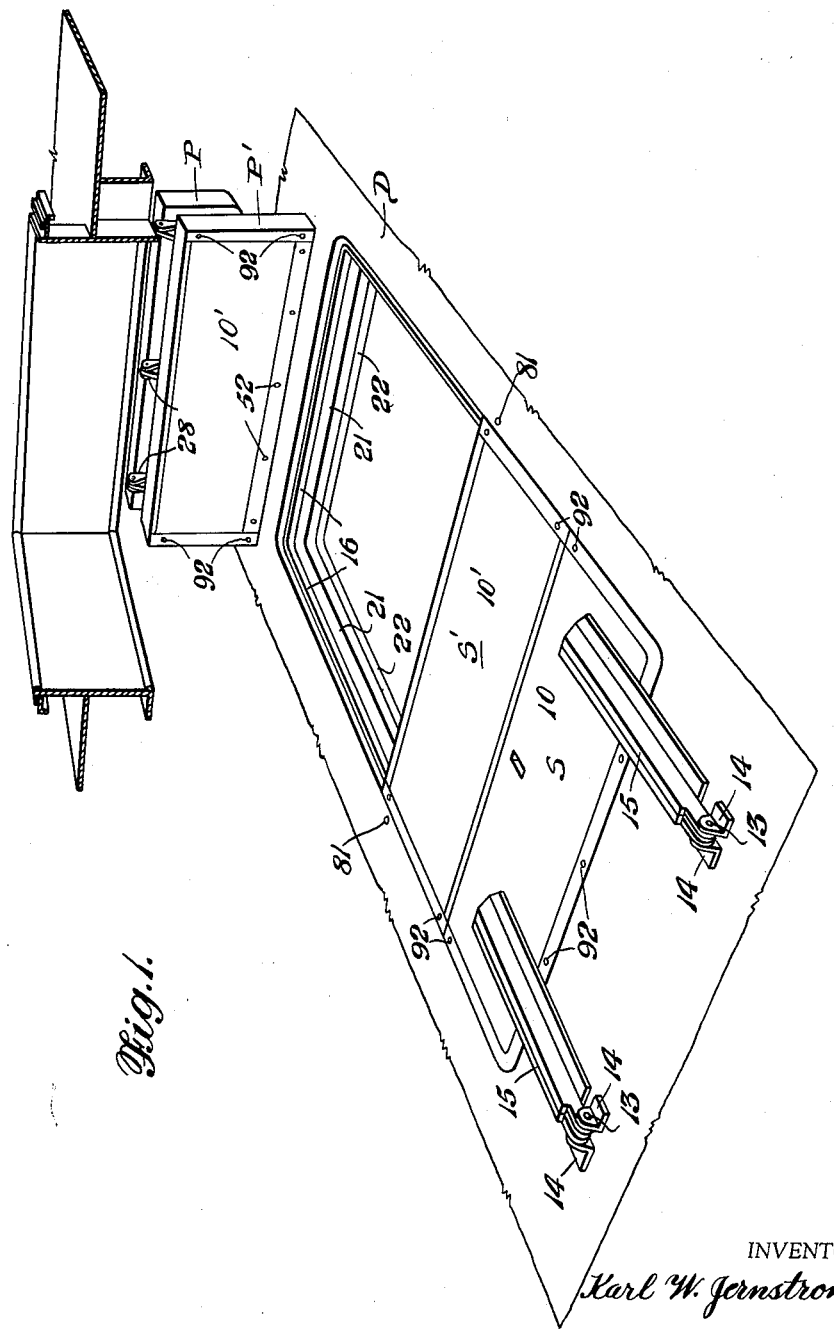
INVENTOR
Karl W. Jernstrom
BY
Alvin Broudy
ATTORNEY Dec. 13, 1955 K. W. JERNSTROM 2,726,623
HATCH COVER
Filed Oct. 15, 1952 9 Sheets-Sheet 2
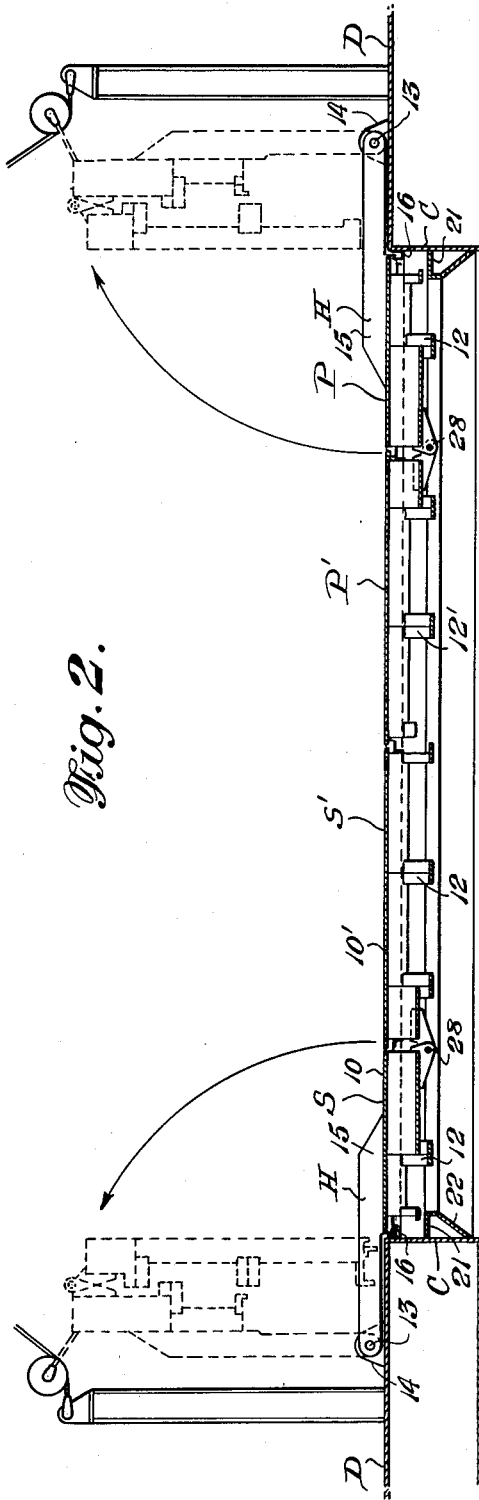
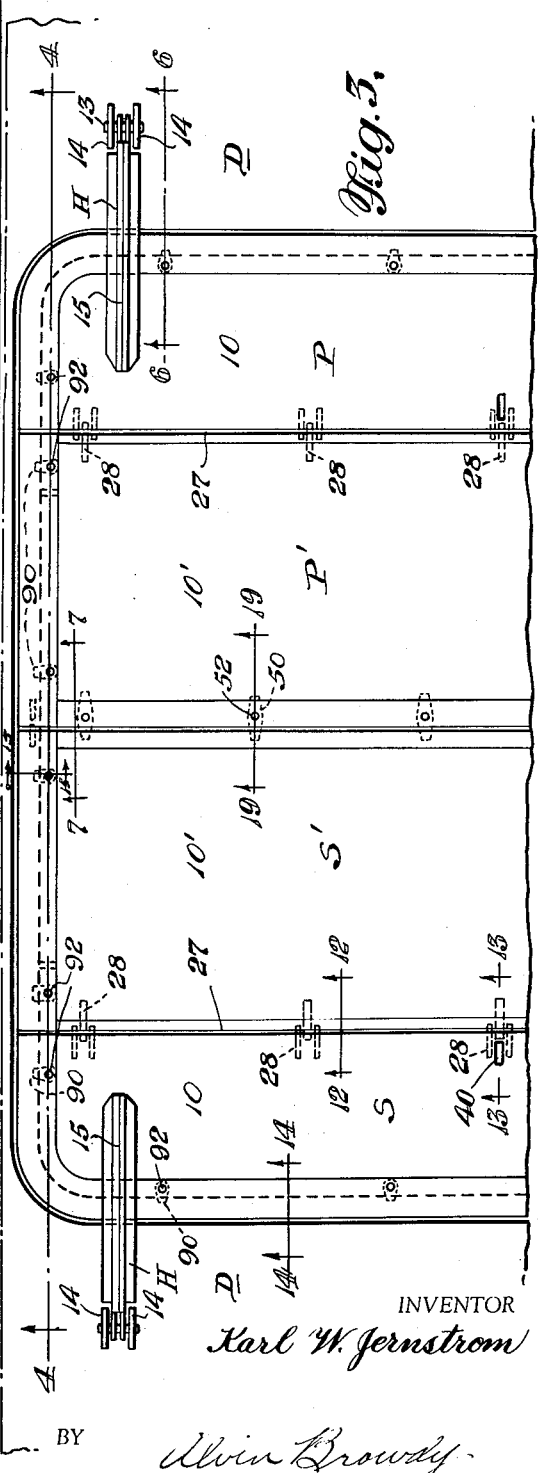
INVENTOR
Karl W. Jernstrom
BY
Alvin Browdy
ATTORNEY

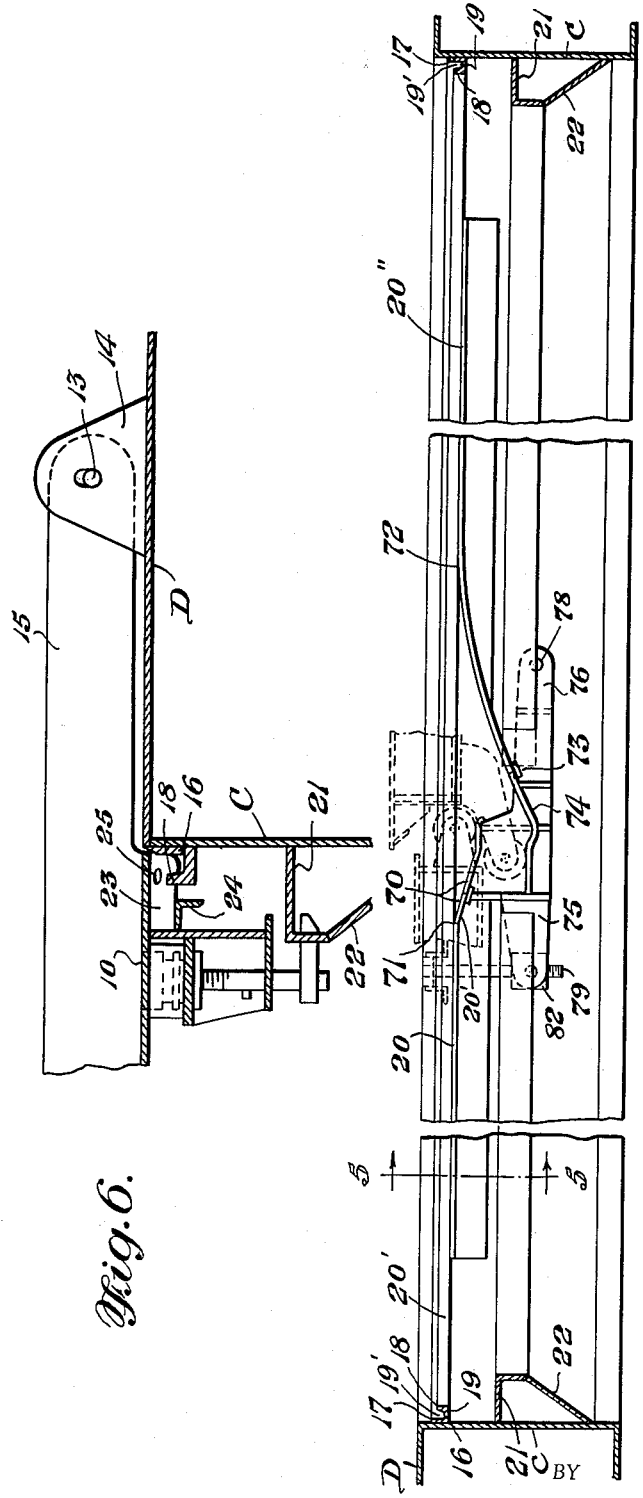

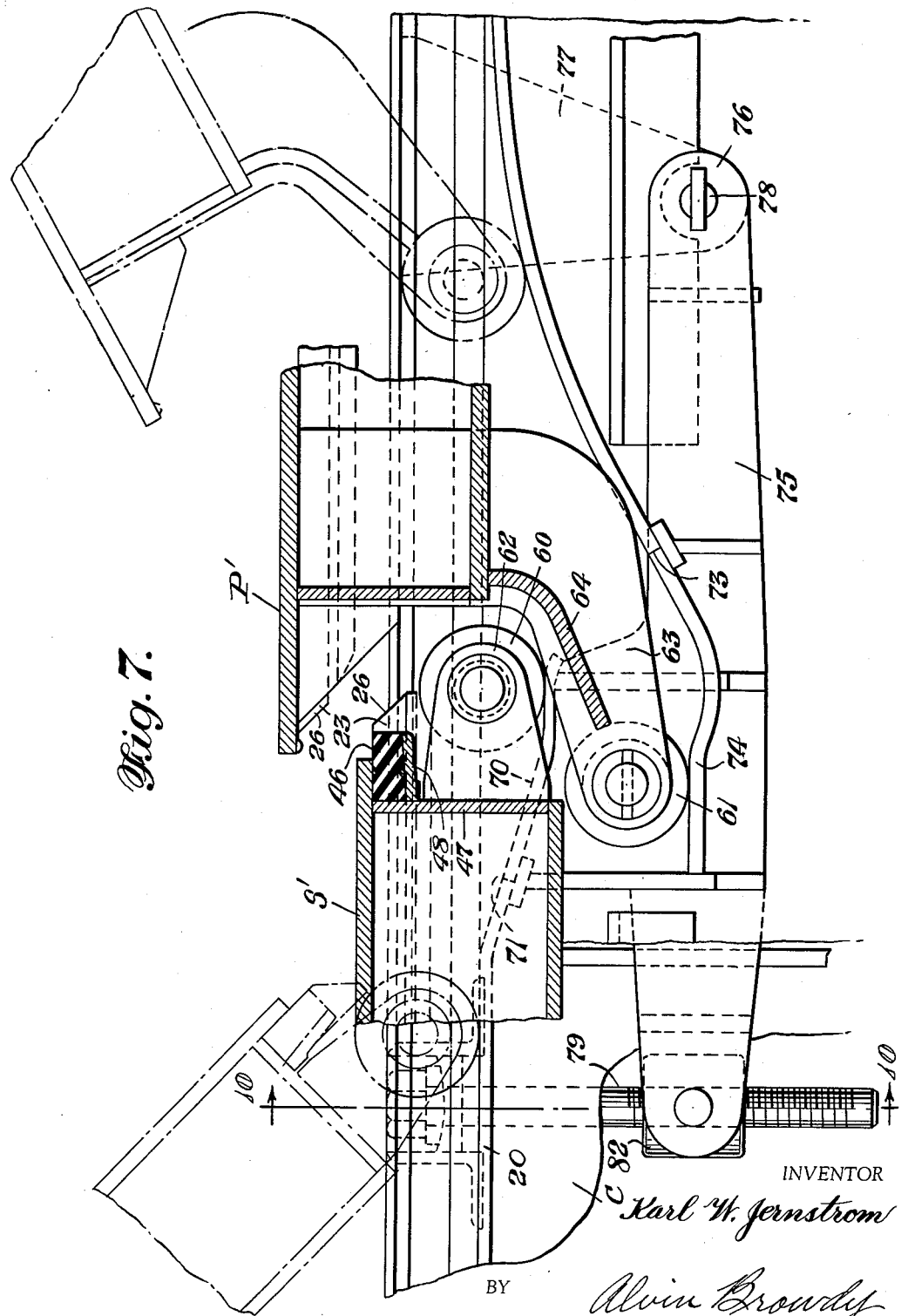

Dec. 13, 1955  K. W. JERNSTROM  2,726,623
HATCH COVER
Filed Oct. 15, 1952  9 Sheets-Sheet 5
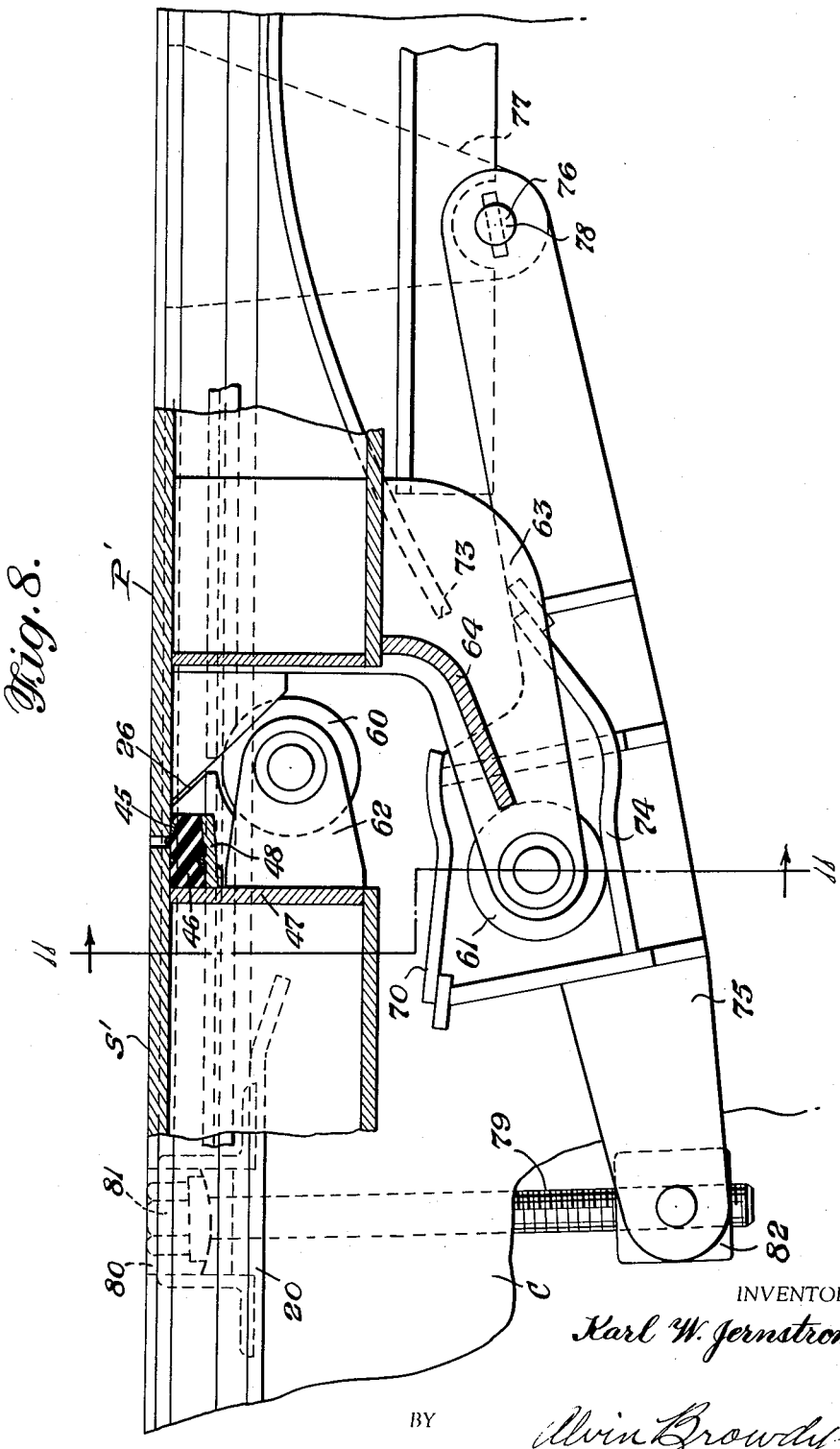
INVENTOR
Karl W. Jernstrom
BY
Alvin Browdy
ATTORNEY

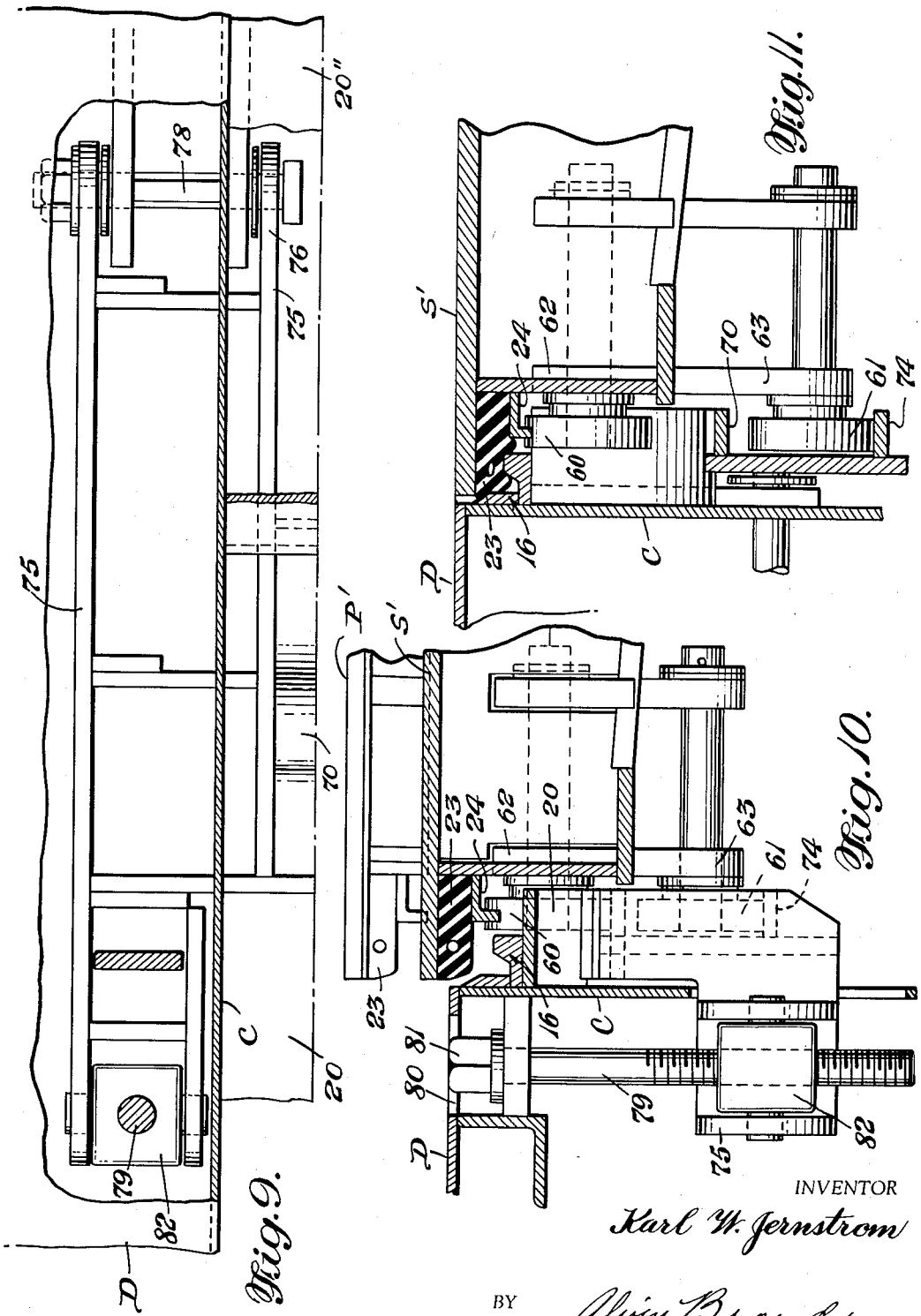

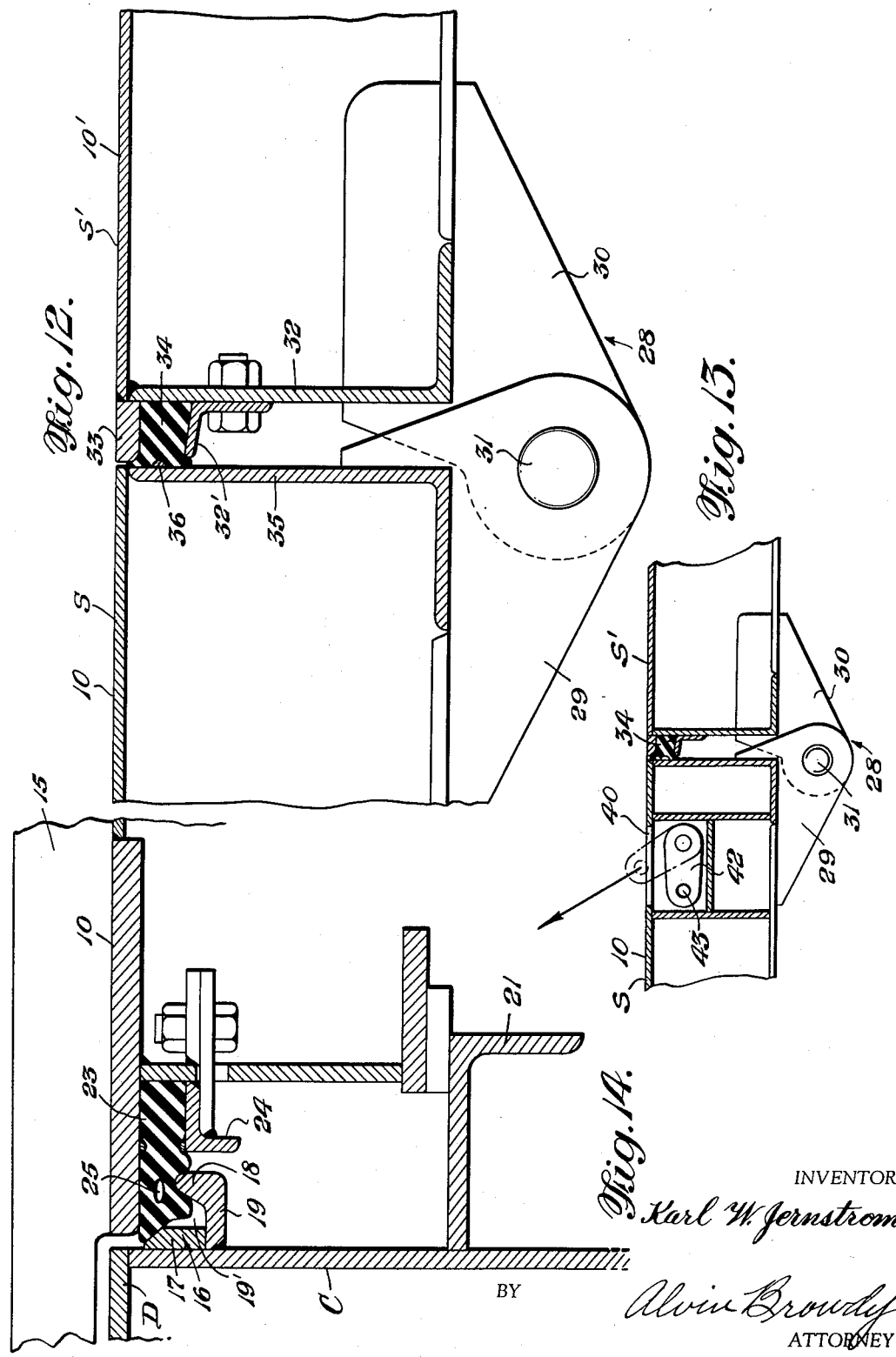

Dec. 13, 1955  K. W. JERNSTROM  2,726,623
HATCH COVER
Filed Oct. 15, 1952  9 Sheets-Sheet 8
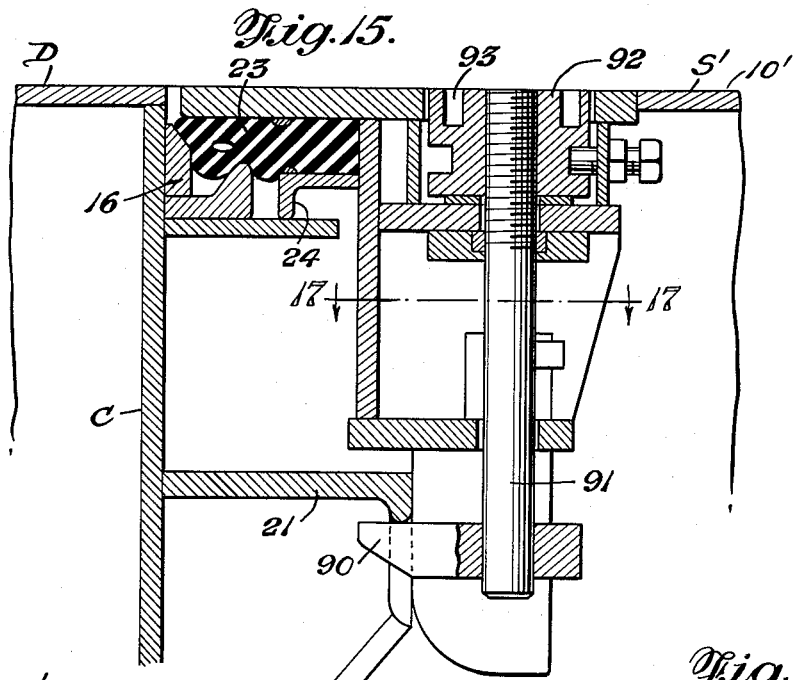
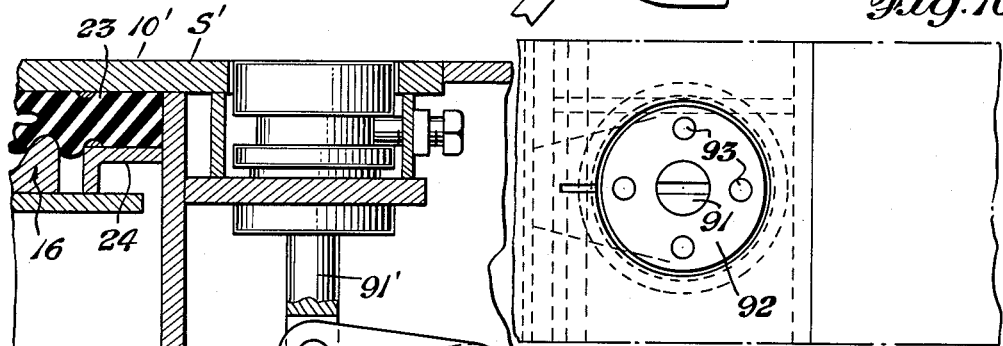
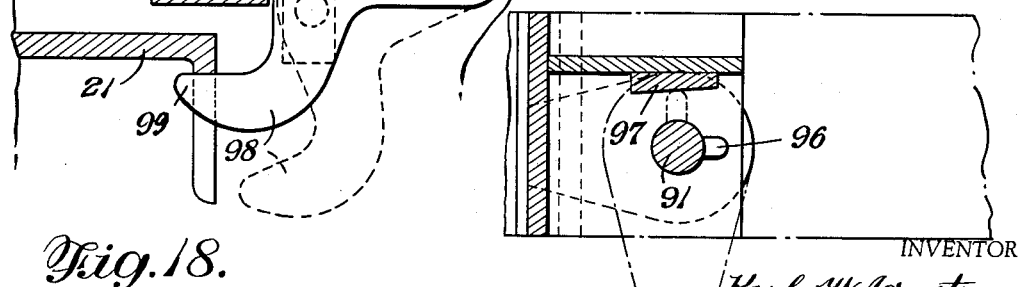
INVENTOR
Karl W. Jernstrom
BY Alvin Browdy
ATTORNEY Dec. 13, 1955 K. W. JERNSTROM 2,726,623
HATCH COVER
Filed Oct. 15, 1952 9 Sheets-Sheet 9

INVENTOR
Karl W. Jernstrom
BY Alvin Browdy
ATTORNEY

United States Patent Office 2,726,623
Patented Dec. 13, 1955

2,726,623

HATCH COVER

Karl W. Jernstrom, Verona, N. J., assignor to Seaboard Maritime Corporation, a corporation of Florida Application October 15, 1952, Serial No. 314,778

16 Claims. (Cl. 114—201)

This invention relates to hatch covers for ships and more particularly to articulated water-tight hatch covers flush with the deck which are hinged to the deck at one end and have wheels at the free end thereof.

It has heretofore been customary to close cargo hatches by placing a large number of wooden or metal planks or interlocking sections side-by-side across the hatch and covering them with tarpaulin which is then lashed down to give a water-tight closure. In order to open the hatch to load or unload cargo, it was necessary to unlash and remove the tarpaulin and take off the planks or sections one by one. On a large ship, the opening and closing of a hatch may require several hours, and considerable labor. Moreover, the planks must be stacked on the deck, taking up valuable space, and hindering the loading and unloading. The maintenance of a large ship in port is very costly and any steps which can be taken to reduce the loading and unloading time aid materially in economical operation. Further, in large modern vessels having numerous hatches, the matter of making them waterproof, air-tight and strong is extremely important, and the use of the planks or sections and tarpaulin for keeping the water off have not proven as effective and economical as desirable, particularly when air-tight hatch covers are necessary.

It has heretofore been proposed to correct these defects by utilizing a pair of oppositely disposed articulated hatch cover sections hinged at one end to the deck, and provided with wheels at the free ends thereof. Such covers in closed position will bridge a very large hatchway, and yet, when opened and folded, occupy but little of the deck area. Such hatch covers have provided a number of problems, which have not been adequately solved, particularly when air and water-tight flush deck covers are essential. Particularly difficulty is experienced in obtaining adequate and lasting seals along the periphery of the hatch, at the intermediate joints of each section, and at the meeting edges of the two sections. In previous hatch covers, when an adequate seal is obtained at the meeting edges of the two sections, overlapping of the sections is involved and, therefore, it is necessary in opening the cover that the two sections be opened in a particular order. This limits the use of the hatch, since it is often essential that either cover section may be removed without interfering with the other cover. Further difficulties are encountered when a hatch cover is desirable that is flush with the deck when in the closed position, and yet is water-tight. The flush type hatch cover is particularly desirable for use in 'tween decks so that there will be no obstructions when the hatch is closed. These difficulties include the providing of dogs, intermediate hinges, jacking arrangements, wheel constructions and the like, which do not project above the deck.

Accordingly, it is an object of the present invention to provide a hatch cover arrangement which is flush with the deck when in the closed position and may be readily locked in closed position to yield a strong, completely water-tight hatch cover.

It is a further object of the present invention to provide a hatch cover of the class described which may be readily unlocked and unsealed from the closed position and easily removed from the hatch to a vertical position alongside thereof.

It is a still further object of the invention to form a hatch cover that may be put on and taken off with the least expenditure of labor and time possible, and when fully secured upon the hatch will fully restore to the ship the strength otherwise lost by the hatch openings.

It is a still further object of the present invention to provide an articulated hatch cover having at least two sections, wherein the meeting edges of two of the sections and the intermediate joints of each section are securely sealed against leakage.

It is a still further object of the invention to provide a hatch construction with a novel track arrangement which guides the meeting edges of the two sections of the hatch cover into proper sealing relationship.

It is still a further object of the invention to provide a novel peripheral sealing arrangement between the coaming and the hatch cover.

It is a still further object of the invention to provide a novel jacking arrangement for a flush type hatch cover which may be operated from the deck with no protruding parts.

It is a still further object of the invention to provide novel dogging arrangements with no protruding parts for the periphery of a flush type hatch cover.

It is a still further object of the invention to provide a novel dogging arrangement with no protruding parts for the meeting edges of a two-sectioned flush type hatch cover.

These and other objects are accomplished by the following invention, wherein a coaming flush with the deck is provided with an internal weatherstripping below the surface thereof extending entirely around the coaming, a novel track arrangement at each side internally of the coaming and below the surface thereof, a portion of the track arrangement near the center of the hatch being separate from the balance thereof, a jacking arrangement for raising or lowering the separate portion of track, and a two-sectioned articulated hatch cover, each section of which is hinged at one end and provided with a wheel construction at the free end thereof which is adapted to ride on the track, and dogging arrangements at the meeting edges of the hatch cover sections and about the periphery of the hatch cover for locking the hatch cover to the coaming, whereby when the hatch covers are locked in closed position, their upper surfaces lie flush with the deck.

Other objects and the nature and advantages of the instant invention will be apparent from the following description taken in conjunction with the accompanying drawings, wherein:

Fig. 1 is a perspective view of the hatch cover showing one section thereof in closed position and the other section being opened;

Fig. 2 is a diagrammatic elevational section of the hatch showing the cover in the open position in dotted lines;

Fig. 3 is a fragmentary plan view of approximately one-half of the hatch shown with the cover in the closed position;

Fig. 4 is an elevational section taken along the line 4—4 of Fig. 3, showing the track arrangement with portions of the cover shown in dotted lines;

Fig. 5 is a cross section taken along the line 5—5 of Fig. 4;

Fig. 6 is a cross section taken along the line 6—6 of Fig. 3;

Fig. 7 is a section taken along the line 7—7 of Fig. 3, showing the track and jacking arrangement with the meeting edges of the cover in unlocked position in full lines and being opened in dotted lines;

Fig. 8 is a similar view to Fig. 7, showing the hatch cover in closed position;

Fig. 9 is a detailed plan view showing the track and jacking arrangement;

Fig. 10 is a cross sectional view taken along the line 10—10 of Fig. 7;

Fig. 11 is a cross-sectional view taken along the line 11—11 of Fig. 8;

Fig. 12 is the section 12—12 of Fig. 3;

Fig. 13 is the section 13—13 of Fig. 3;

Fig. 14 is the section 14—14 of Fig. 3;

Fig. 15 is the section 15—15 of Fig. 3;

Fig. 16 is a partial plan view of Fig. 15, showing the dog in locked position;

Fig. 17 is the section 17—17 of Fig. 15, showing the dog in locked position in dotted lines and in unlocked position in dot-dash lines;

Fig. 18 is a view similar to Fig. 15, showing an alternative dogging arrangement;

Figure 19:
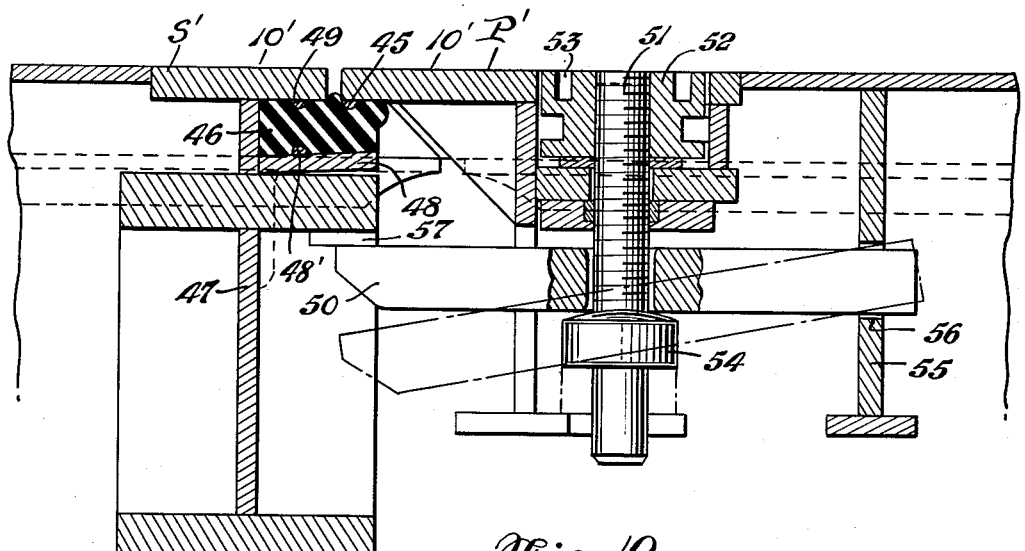
Fig. 19 is a section of 19—19 of Fig. 3.
Figure 20:
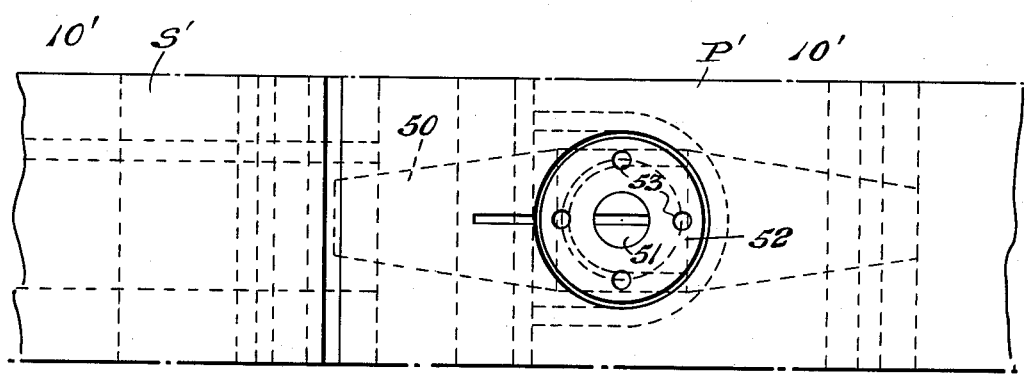
Fig. 20 is a plan view of Fig. 19.

The general arrangement of the hatch when in closed position is seen in Fig. 3. The port and starboard sections of the cover are generally similar, except for the means for sealing and locking the free ends of the sections together when the hatch is closed. As shown, each section comprises two pivotally joined panels, an outer panel hingedly mounted on the deck of the ship adjacent an end of the hatchway, and an inner panel, the free edge of which extends to the middle of the hatchway when the section is closed. It should be understood, however, that the invention contemplates both a hatch which may have an articulated cover built as a unit, or a cover comprising two articulated units or sections, as illustrated. Further, where two sections are employed, it is not material that the sections be substantially of the same size, as illustrated; one section might well be formed of much larger panels than its companion, or of more than two panels. This invention is particularly applicable to an articulated hatch cover of two sections where one section has two panels and the other four panels, this construction being dictated, on account of greater available free deck space at one end of the hatchway than at the other. In such construction, of course, the sections would not join in the middle of the hatchway.

With reference particularly to Figs. 2 and 3, the outer panel of the port section of the cover is designated P, the inner panel thereof P'; the outer panel of the starboard section is designated S, the inner panel thereof S'. As seen, each outer panel is provided with two hinge structures H connecting the panel to the deck. C is the hatch coaming, and D is the deck. In Fig. 1 is shown a perspective view of the hatch cover shown in use on a hatch located on a 'tween deck D. The structure shown above the open section P, P' of the cover is a representation of the hatch opening in the upper deck located directly above the hatch opening in 'tween deck D.

In the particular embodiment of the invention herein illustrated, each panel of a cover section is a rigid composite structure comprising a cover plate 10, 10' and transverse beams 12, 12'.

All hinge structures H for mounting the outer panels are either alike or complementary to each other. As shown in Figs. 2, 3 and 6, the hinge comprises a shackle formed of two like elements 14 suitably secured to the deck, and a member 15 secured to the edge of the outer panel at the outer end of the section. The member 15 is pivotally secured within the shackle by means of a pin 13 passed through the hinge structure. The hole in the elements 14 is elongated, as best shown in Fig. 6, to provide for the release of the cover in a vertical direction when the cover is released from the locked position and before it is removed. This feature results in longer wear of the sealing gaskets since the engagement and release of the weatherstripping is in a vertical direction.

It will be understood from Fig. 2, that the coaming C is flush with the deck D at its upper surface and extends downwardly into the hatch. On the inner surface of the coaming C extending completely about the periphery thereof, slightly below the surface of the deck, is mounted a weatherstripping 16 which may be welded or otherwise secured to the coaming. As shown in the drawings, the weatherstripping 16 is somewhat U-shaped having upstanding portions 17 and 18 and a bottom portion 19. The space enclosed by the portions 17, 18 and 19 forms a trough 19' which serves to catch any water which may leak into the hatch from the deck. The upper ends of the portions 17 and 18 serve to engage the gasket on the hatch cover in a two-point seal which will be described hereinafter.

On the inner surface of the coaming C on opposite sides thereof, below the weatherstripping 16, is a track arrangement 20 which extends inwardly from the coaming beyond the weatherstripping 16. Mounted below the weatherstripping 16, and extending completely about the hatch, is an angle member 21. Member 21 is suitably secured to the inner surface of the coaming C and is braced by a member 22. Member 21 acts in conjunction with the dogging arrangements to be described hereafter to lock the hatch cover to the coaming.

Mounted on the lower surface of the complete periphery of the hatch cover is a resilient gasket 23 which is retained in place by an angle member 24. The gasket 23 is relatively wide and somewhat rectangular in cross section. At a point near the outer edge thereof a hole 25 is provided which extends the entire length of the gasket. The hole 25 is located adjacent the point where the inner upstanding portion 18 of the weatherstripping 16 engages the gasket 23. This hole increases the resiliency of the gasket and when the weight of the hatch cover is applied, the weatherstripping 16 engages the gasket at both upstanding portions 17 and 18 to give a double seal, as best shown in Figs. 11 and 15. Any water leaking past the outer seal will collect in the trough portion 19' of the weatherstripping 16 and be sealed off from the hatch by the inner seal. At the meeting edges of the sections, the gaskets 23 are tapered as shown at 26 in Figs. 7 and 8, so as to join together to render the seal continuous across the meeting edges of the sections.

It is to be understood that the gasket 23 is continuous about the periphery of three sides of the outer panels P, S and at the outer edges of the inner panels P', S'.

As the form of hatch cover herein illustrated comprises four panels, it will be readily understood that three transverse joints across the hatchway are required to be provided with means for rendering them water-tight when the cover is closed. As shown in Fig. 2, the outer panel and the inner panel of each section are pivotally joined on an axis 27 by means of a plurality of intermediate hinges 28. These hinges are mounted on the normal underside of the panels, as best shown in Fig. 12. Thus, when the section is in closed position, the hinges are not visible and do not obstruct the deck portion of the hatch cover. The hinge 28 comprises a shackle formed of two like elements 29 suitably secured as by welding to the underside of the outer panel; and a member 30 also secured as by welding to the underside of the adjoining inner panel, the member 30 being pivotally secured within the shackle by means of a pin 31. Secured to the cover plate at the outer edge of the inner panel S' is an end wall 32 extending downwardly therefrom. The upper edge of the end wall 32 is provided with an angle 32' which is bolted to the outer edge thereof. A plate 33 is welded to the cover plates of the inner panel, and a resilient gasket 34 is retained in position between the angle 32 and the plate 33. Secured to the cover at the inner edge of the outer panel S is an end wall 35 extending downwardly therefrom. A rib 36 is attached thereto near the upper surface thereof. The gasket 34 extends slightly beyond the angle 32' and plate 33, so that it is in contact with end wall 35 and rib 36 of the outer panel when the section is in horizontal or closed position. This forms a seal between the inner and outer panel of each section which extends from side to side of the hatchway when the cover section is closed. With the section in closed position, as shown in Fig. 2, the gasket 34 engages and presses against rib 36 of the end wall 35 at the inner edge of the outer panel, slightly deforming the gasket and providing a water-tight seal along the joint of the two panels of the section.

As best shown in Fig. 13, an opening 40 is provided in the top plate 10 adjacent to the intermediate hinge located along the center line of the hatch cover. Vertical and horizontal members are provided around the opening 40 to a water-tight box 41 under the opening 40. A member 42 having a hole 43 at one end is pivotally secured at its other end within the box 41 and is adapted to pivot upwardly until the hole 43 extends above the top plate of the cover. Suitable equipment can be attached to the member 42 for raising the cover to buckle at the pivotal joint of the panels, as indicated by the arrows in Fig. 2.

A seal construction is provided at the junction of the two sections of the cover at the center of the hatchway. In the structure shown in Figs. 7, 8, 19 and 20, a rib 45 extending the width of the cover panel P' is mounted on the underside of the cover plate at the meeting end thereof and a cooperating gasket 46 is mounted on the adjacent panel S'. A transverse plate 47 is provided beneath the cover plate 10' of panel S' near the free end thereof. Secured to the plate 47 near the upper end thereof is a strip 48. The gasket 46 is retained between the strip 48 and the cover plate 10' with the end of the gasket 46 extending beyond the cover plate 10'. When in closed position, the rib 45 engages the gasket 46 along the meeting edge to give a water-tight seal. It will be noted that the angle between strip 48 and plate 47 is less than 90°. This provides a channel to receive the gasket 46 which is wider at the base than at the mouth thereof, thus preventing withdrawal of the gasket. In addition, a rib 48' may be provided on the upper surface of strip 48 and a rib 49 on the lower surface of the top plate 10' to likewise engage the gasket and serve to retain it within the channel.

When the cover is in fully closed position, as illustrated in Figs. 8 and 19, the gasket 46 is engaged by the rib 45 on the adjacent panel, the gasket being slightly deformed by pressure derived from the weight of the section, as shown, and thereby a water-tight seal is provided across the middle of the hatchway.

It will be seen from Figs. 8 and 19 that the panel S' cannot be moved until the panel P' has been moved a slight distance upwardly therefrom in order to disengage the gasket 46 from the rib 45. However, it will be shown subsequently that the median seal of the hatch may be broken in a simple manner, whereupon either cover section may be then raised, buckled and removed without interfering with the other section.

The meeting edges of panels S' and P' may be locked in the closed position by means of dogs 50, illustrated in Fig. 19. A plurality of dogs are provided at the meeting edge, spaced as shown in Fig. 3, which may be actuated from the top surface of the hatch cover, yet has no protruding parts. A threaded shaft 51 extends downwardly from a round threaded tightening nut 52 located flush with the top plate of the cover. The tightening nut is provided with four holes 53 in the top surface thereof. The dogging element 50 is mounted more or less freely on the shaft 51, and is retained thereon by a nut 54 which is secured to the lower end of the shaft 51. A transverse plate 55 is attached to the cover plate 10' and extends downwardly therefrom. An opening 56 in the plate 55 is adapted to receive one end of the dogging element 50. The dogging element 50 can wobble on the shaft 51 until the dog shaft is tightened. The tightening is effected by inserting a four-prong key into the holes 53 in the tightening nut 52, which cooperates with the threaded upper end of the dog shaft. When this tightening operation is effected, it will bring the nut 54 on the lower end of the shaft upward into engagement with the dogging element 50 and bring the dogging element into engagement with the plate 57 mounted on the adjacent panel S'. It must be borne in mind that conventional means, such as a slotted projection (not shown), prevent the shaft 51 from turning when the tightening nut 52 is rotated, so that when the tightening nut is turned, the shaft will move upwardly.

The inner panel of each section of the cover is provided with a wheel at each corner of the free end of the section, the wheels being adapted to roll lengthwise of the hatch along the track 20.

The wheels are carried each by a bracket mounted near each edge of the inner panels beneath the top plate thereof. As shown more clearly in Figs. 7, 8, 10 and 11, the wheels of the panel S' are designated 60, those of the panel P' 61. Wheels 60 are carried by brackets 62 mounted on the plate 47 near each end thereof. The brackets 62 and wheels 60 extend slightly beyond the free end of the panel S' below the upper surface thereof. The wheels 60 and brackets 62 extend at approximately right angles to the plate 47. The wheels 61 are carried by brackets 63 which extend downwardly and forwardly from the free end of the panel P' at a point near each end thereof. Stiffening members 64 are welded onto the brackets 63. The brackets 63 and wheels 61 extend beyond the free end of the panel P'. As illustrated in Figs. 10 and 11, the wheels 60 and 61 are mounted in the same vertical plane and are adapted to travel on the track 20. As illustrated in Figs. 7 and 8, it will readily be seen that the wheels 60 and 61 are not mounted in the same horizontal plane; wheels 61 being mounted a greater distance below the top plate than are wheels 60.

The track 20, as previously suggested, is attached to the coaming C and extends inwardly therefrom. As shown in Figs. 4 and 5, the track 20, on which the wheels 60 travel, is horizontal along the greatest part of the length of the hatch, being mounted slightly below the weather-stripping 16 with the wheels 60, travelling on the track slightly inwardly from the weatherstripping 16. At the point 71 in the track, near the center of the hatchways, is a movable section of track 70 which is adapted to be lowered from an upper position (as shown in Figs. 4 and 7) where it is in alignment with the track 20 to a lower position (as shown in Fig. 8) where it is lower than the remainder of the track 20'. The section of the track 20" on which the wheels 61 travel is located adjacent to the panels P, P' and is likewise horizontal throughout the greater part of its length, being mounted in the same horizontal plane as the track 20'. At the point 72 in the track 20", the track begins to curve downwardly to the point 73. Beginning at the point 73 is a movable section of track 74 which is integral with the movable section 70 and is adapted to be lowered with section 70 from an upper position where it is in alignment with the track 20" to a lower position where it is lower than the remainder of the track 20". The section of track 74 is located directly below the section 70, so that as the covers are closed, the wheels 61 are directed by the track 20" and 74 to a position directly below the wheels 60 which are on the track 70. The movable section of the track 70, 74 is not attached to the coaming as is the balance of the track 20', 20". The movable section of track is attached to a lever 75 which is pivotally mounted at one end at 76 by means of a pin 78 extending through a bracket 77 attached to the underside of the deck alongside the hatchway. The other end of lever 75 is mounted on a jack screw 79 which is threaded at its lower end. This jack screw extends upwardly through a hole 80 in the deck and terminates in a head 81 flush with the deck and adapted to accommodate a wrench. The threaded portion of the jack screw 79 passes through a nut 82, which is located within a suitable framework to prevent rotation thereof, as will be understood from the showing of Figs. 7 and 10.

Thus, when the sections are being closed, the movable portion of the track is raised into alignment with the immovable sections thereof. The wheels 60 and 61 travel on the immovable sections of track 20' and 20", respectively, and thence onto the movable section of the track 70 and 74, respectively. The dotted lines in Fig. 7 show the two sections of the cover travelling on the immovable sections of the track, and the full lines in Figs. 7 and 10 show the two sections of the cover resting on the movable section of track. At this point in the travel, the covers are in the closed, but unlocked position, and while in the unlocked position, wheels 60 and 61 are resting on the movable section of the track and either section of the cover can be removed at will. It will be noted in Figs. 7 and 8 that the structures of brackets 62 and 63 are such that the wheels 60 are closer to the top of panel S' than the wheels 61 are to the top of panel P'. Thus, when both sections are in nearly closed position, as in dotted lines in Fig. 7, the wheels being on about the same level, the free end of the panel P' is markedly higher than the free end of the panel S'. As the wheels 61 travel down the inclined portion of the immovable track 20" to the position shown in full lines in Fig. 7, the panels P' and S' assume a position wherein their levels are somewhat the same, but the panel P' is still sufficiently higher than panel S' so that the rib 45 of panel P' is entirely out of engagement with the gasket 46 of the panel S'. With the sections in this position, it is possible to open independently either section. It will be understood that the raising and buckling of a section initially simply draws the free end of the section away from the center of the hatchway.

To lock the two sections together, the jack screw head 81 is rotated by a wrench, thus rotating the jack screw 79 and lowering the nut 82 on the jack screw. The lever 75 pivots downwardly about the pin 78, thus lowering the movable section of track in an arc movement about the pivot point of the lever. As the movable section of track is lowered, the two sections of the cover are likewise lowered. As the track is lowered, the panel S' is lowered until the entire section comes to rest upon the weatherstripping, considerably before the track is at its lowest position. Thus, when the starboard section is arrested, by engagement of the gaskets with the coaming weatherstrip, the descending track 70 is carried away from the wheels 60. Thus, the wheels 60 are supported only by their axles and brackets. The port section, of course, continues to descend until it is arrested by engagement with the coaming weatherstrip. Just prior to final sealing, the rib 45 on the panel P' comes into engagement with the gasket 46 on the panel S'. The seals between the panels of the sections at their pivotal joints are effected when the panels become coplanar. When in fully closed position, the two panels P' and S' are flush with the deck and with each other and the dogs 50 can be locked by rotation of the nuts 52 until the full line position of Fig. 19 is reached. In this position, the covers are locked together and to the coaming.

While it will be understood from the foregoing that the movable tracks are essential for effecting completion of the peripheral seal when closing the cover, it will also be understood that the jacks serve also to break a seal which may have become an exceedingly strong bond during a voyage.

In addition to the dogs 50 for locking the meeting edges of the cover together, there are provided side and end dogging arrangements, best shown in Figs. 6, 15, 16 and 17 for clamping the panel sections in position. The side and end dogging devices are located slightly inwardly from the periphery of the cover and are located beneath the cover with no upwardly extending parts, yet can be operated from the top surface of the cover. The dogs 90 are mounted at the lower end of a threaded shaft 91, which shaft extends downwardly from a round threaded tightening nut 92 located flush with the top plate of the cover. The tightening nut 92 is provided with four holes 93 in the top surface thereof. The dogs 90 are adapted to engage beneath the angle member 21 which is mounted on the coaming, thereby locking the hatch cover to the coaming. The tightening of the dog 90 against the member 21 is effected by inserting a four-prong key into the holes 93 in the tightening nut 92 and rotating it. Rotation of the tightening nut raises the shaft 91 until the dogs 90 are tightly in engagement with the angle members 21. The shaft 91 is prevented from rotating with the tightening nut by means of a slot and projection. The upper end of the shaft 91 is provided with a groove 95, which may be engaged by a suitable tool to rotate the shaft 91 by 90° when shaft is in its lower position and the dog 90 is not in engagement with member 21. Rotation of the shaft 91 by 90° likewise rotates the dog 90 by 90° to the position shown in Fig. 17 in dash-dot lines. In this position, the dog is out of the way of the coaming and the hatch cover may then be lifted. The dog is retained in this unlocked position by means of a projection 96 on the shaft 91 coming into engagement with a wedge-shaped block 97 (Fig. 17). The dog is retained in this unlocked position at all times when the cover is removed from the hatch, and the wedge locking arrangement prevents accidental rotation of the shaft 91.

An alternative side and end dogging arrangement is illustrated in Fig. 18. The dog 98 is mounted on the lower end of shaft 91' at a mid point on the dog 98. The dog 98 is pivoted at its inner end to the cover and is provided with an engaging hook 99 at its outer end, adapted to engage the angle member 21 when the shaft is in its upper position. As the shaft 91' is lowered, the dog 98 pivots downwardly about its pivot point until the hooked end 99 is free of the member 21, permitting the hatch cover to be opened. As long as the shaft remains in the lower position, the dog is out of engagement with the coaming. As soon as the cover is closed and the shaft is raised, the hooked end of the dog raises until it is in engagement with the coaming, thus locking the cover and the coaming in a simple fashion.

When the cover is in the closed, but unlocked, position, the gaskets and weatherstripping are not in engagement, and the pins 13 of the hinges H are located at the top of the elongated hole in the elements 14 (Fig. 6). When the covers are locked by engaging all the dog arrangements, the final movement of the covers is in a vertical direction so that the weatherstripping engages and is released from the gaskets in a vertical direction, resulting in a longer life of the sealing gaskets.

The track arrangement described heretofore is equally applicable to non-flush type hatch covers and may be mounted either internally of the coaming, as illustrated herein, or externally of the coaming.

The various dog arrangements described heretofore are likewise applicable to non-flush type hatch covers.

It will be obvious to those skilled in the art that various changes may be made without departing from the spirit of the invention and, therefore, the invention is not limited to what is shown in the drawings and described in the specification but only as indicated in the appended claims.

What is claimed is:

1. In a hatch structure, a deck, a hatch opening, a coaming, weatherstripping extending about the entire periphery of said hatch opening, a track arrangement attached to said coaming, an articulated hatch cover, said cover comprising two opposite sections adapted to meet, when closed, intermediate the ends of the hatch, each section formed of at least two panels pivotally joined edgewise, one panel of each section being hingedly mounted outside the coaming at an end of the hatch, and the other panel of each section having wheels mounted at its free end, the wheels being adapted to roll on the tracks, whereby as the first-named panel is rotated from closed position, the cover is buckled, and the last-named panel is trundled to the end of the hatch, gaskets mounted about the periphery of said hatch cover adapted to rest on said weatherstripping when in the closed position to seal the entire periphery of said hatch opening, said track arrangement comprising a first track for the wheels of one section of the hatch cover and a second track for the wheels of the other section of the hatch cover, said second track sloping downwardly at a point near the meeting edges of the hatch cover sections when closed to a point located beneath said first track whereby when said sections of the hatch cover are in closed position the wheels of one section are located below the wheels of said other section.

2. In a hatch structure, a deck having a hatch, a coaming, a track arrangement attached to said coaming, an articulated hatch cover having a flat upper surface, said cover comprising two opposite sections adapted to meet, when closed, intermediate the ends of the hatch, each section formed of at least two panels pivotally joined edgewise, one panel of each section being hingedly mounted outside the coaming at an end of the hatch, and the other panel of each section having wheels mounted at its free end, the wheels being adapted to roll on said track arrangement, whereby as the first-named panel is rotated from closed position, the cover is buckled, and the last-named panel is trundled to the end of the hatch, said track arrangement comprising a first track for the wheels of one section of the hatch cover and a second track for the wheels of the other section of the hatch cover, said second track sloping downwardly at a point near the meeting edges of the hatch cover sections, when closed, to a point located beneath said first track whereby when said sections of the hatch cover are in closed position the wheels of one section are located below the wheels of said other section.

3. In a hatch structure in accordance with claim 2, wherein said portion of the track arrangement in which the second track is located beneath said first track is separate from the balance of said first and second tracks, and said portion is movable in a generally vertical direction from a point in alignment with said first and second tracks to a point therebelow for locking said meeting edges of the two sections of the hatch cover.

4. In a hatch structure in accordance with claim 1, wherein said portion of the track arrangement in which the second track is located beneath said first track is separate from the balance of said first and second tracks, and said portion is movable in a generally vertical direction from a point in alignment with said first and second tracks to a point therebelow for locking said meeting edges of the two sections of the hatch cover.

5. In a hatch structure in accordance with claim 3, wherein said movable portion of the track arrangement is mounted on a lever which is pivoted at one end and mounted on a jack screw at the other end, said jack screw extending upwardly through said deck, whereby as said jack screw is rotated, said lever pivots to raise or lower said movable portion of the track.

6. In a hatch structure in accordance with claim 4, wherein said movable portion of the track arrangement is mounted on a lever which is pivoted at one end and mounted on a jack screw at the other end, said jack screw extending upwardly through said deck, whereby as said jack screw is rotated, said lever pivots to raise or lower said movable portion of the track.

7. In a hatch structure in accordance with claim 4, wherein as said movable section of track is lowered the peripheral gaskets on the first section of the hatch cover engage the weatherstripping and sustain the entire weight of said section of hatch cover with wheels of said first section of the hatch cover being suspended without contacting the first track.

8. In a hatch structure in accordance with claim 6, wherein as said movable section of track is lowered the peripheral gaskets on the first section of the hatch cover engage the weatherstripping and sustain the entire weight of said section of hatch cover with wheels of said first section of the hatch cover being suspended without contacting the first track.

9. In a hatch structure, a deck, a hatch opening, a coaming, weatherstripping attached to said coaming and extending about the entire periphery of said hatch opening, a hatch cover adapted to cover said hatch opening, gaskets mounted about the periphery of said hatch cover adapted to rest on said weatherstripping when in the closed position to seal the entire periphery of said hatch opening, said weatherstripping being U-shaped having a pair of upstanding portions and a trough at the lower end, the outer of said upstanding portions being higher than the inner upstanding portion, said upstanding portions each being adapted to engage said gaskets to give a two-point seal about the periphery of said hatch opening, said outer upstanding portion contacting said gaskets prior to said inner upstanding portion during the closing operation, and said trough being adapted to receive any leakage from the first sealing point.

10. In a hatch structure, a deck, a hatch opening, a coaming, a hatch cover adapted to cover said hatch opening, a member attached to said coaming extending inwardly into the hatch opening about the periphery thereof located below the upper surface thereof, a plurality of dog arrangements extending downwardly from said hatch cover about the periphery thereof adapted to engage said member for locking said hatch cover to said coaming, said dog arrangements including a horizontally protruding dog attached to a vertical shaft which extends through the upper surface of said hatch cover, means for raising and lowering said shaft and for rotating said dog 90° from a locking to an unlocking position, additional means for retaining said dog in unlocking position to prevent engagement of said dog with said member when said hatch cover is being removed, said additional means including a wedge-shaped block and a projection on said shaft adapted to engage said block when in the unlocking position to retain said shaft in this position.

11. In a hatch structure in accordance with claim 4, wherein said movable portion of the track arrangement is mounted on a jacking device for raising or lowering said movable portion of the track.

12. In a hatch structure in accordance with claim 3, wherein said movable portion of the track arrangement is mounted on a jacking device for raising or lowering said movable portion of the track.

13. In a hatch structure, a deck having a hatch, a coaming, the upper surface of said coaming being flush with said deck, weatherstripping attached to said coaming extending inwardly into the hatch below the upper surface of said coaming, said weatherstripping extending about the entire periphery of said hatch, a track arrangement extending into said hatch at each side thereof located below said weatherstripping and attached to said coaming, an articulated hatch cover having a flat upper surface, said cover comprising two opposite sections adapted to meet, when closed, intermediate the ends of the hatch, each section formed of at least two panels pivotally joined edgewise, one panel of each section being hingedly mounted outside the coaming at an end of the hatch, and the other panel of each section having wheels mounted at its free end, the wheels being adapted to roll on the tracks, whereby as the first-named panel is rotated from closed position, the cover is buckled, and the last-named panel is trundled to the end of the hatch, and gaskets mounted about the periphery of said hatch cover adapted to rest on said weatherstripping when in the closed position to seal the entire periphery of said hatch whereby the top surface of said cover and said deck are flush, said track arrangement comprising a first track for the wheels of one section of the hatch cover and a second track for the wheels of the other section of the hatch cover, said second track sloping downwardly at a point near the meeting edges of the hatch cover sections when closed to a point located beneath said first track whereby when said sections of the hatch cover are in closed position the wheels of one section are located below the wheels of said other section.

14. In a hatch structure, a deck having a hatch, a coaming, the upper surface of said coaming being flush with said deck, a track arrangement extending into said hatch at each side thereof located below the upper surface of said coaming, an articulated hatch cover having a flat upper surface, said cover comprising two opposite sections adapted to meet, when closed, intermediate the ends of the hatch, each section formed of at least two panels pivotally joined edgewise, one panel of each section being hingedly mounted outside the coaming at an end of the hatch, and the other panel of each section having wheels mounted at its free end, the wheels being adapted to roll on said track arrangement, whereby as the first-named panel is rotated from closed position, the cover is buckled, and the last-named panel is trundled to the end of the hatch, said track arrangement comprising a first track for the wheels of one section of the hatch cover and a second track for the wheels of the other section of the hatch cover, said second track sloping downwardly at a point near the meeting edges of the hatch cover sections, when closed, to a point located beneath said first track whereby when said sections of the hatch cover are in closed position the wheels of one section are located below the wheels of said other section.

15. In a hatch structure in accordance with claim 13, wherein said portion of the track arrangement in which the second track is located beneath said first track is separate from the balance of said first and second tracks, and said portion is movable in a generally vertical direction from a point in alignment with said first and second tracks to a point therebelow for locking said meeting edges of the two sections of the hatch cover.

16. In a hatch structure in accordance with claim 14, wherein said portion of the track arrangement in which the second track is located beneath said first track is separate from the balance of said first and second tracks, and said portion is movable in a generally vertical direction from a point in alignment with said first and second tracks to a point therebelow for locking said meeting edges of the two sections of the hatch.

References Cited in the file of this patent

UNITED STATES PATENTS

| | | |
|---|---|---|
| 335,092 | Robinson | Jan. 26, 1886 |
| 777,878 | Akers | Dec. 20, 1904 |
| 832,093 | Stoltzfus | Oct. 2, 1906 |
| 1,797,765 | Frank | Mar. 24, 1931 |
| 1,835,856 | Fliegel | Dec. 8, 1931 |
| 2,256,087 | Hay | Sept. 16, 1941 |
| 2,334,012 | Koch et al. | Nov. 9, 1943 |
| 2,431,061 | Mayo | Nov. 18, 1947 |
| 2,440,764 | Wilson | May 4, 1948 |
| 2,627,835 | Mege | Feb. 10, 1953 |
| 2,633,613 | MacGregor | Apr. 7, 1953 |
| 2,640,454 | Kummerman | June 2, 1953 |
| 2,707,928 | Farrell | May 10, 1955 |

FOREIGN PATENTS

| | | |
|---|---|---|
| 9,821 | Great Britain | Apr. 25, 1912 |
| 147,333 | Great Britain | July 22, 1920 |
| 336,489 | Great Britain | Oct. 16, 1930 |
| 370,653 | Great Britain | Apr. 14, 1932 |
| 409,231 | Great Britain | Apr. 26, 1934 |
| 461,412 | Great Britain | Feb. 16, 1937 |
| 466,019 | Great Britain | May 14, 1937 |
| 463,404 | Great Britain | Mar. 30, 1937 |
| 611,848 | Great Britain | Nov. 4, 1948 |
| 667,464 | Great Britain | Mar. 5, 1952 |